Patented July 6, 1948

UNITED STATES PATENT OFFICE 2,444,885

PROCESS FOR PRODUCING KETOGULONIC ACID AND ITS ESTERS

Pancras J. van der Laan, Utrecht, Netherlands, assignor to Nederlandsche Organisatie voor toegepastnatuurwetenschappelijk onderzoek ten behoeve van de Voeding, The Hague, Netherlands No Drawing. Application March 22, 1946, Serial No. 656,505. In the Netherlands July 27, 1942

Section 1, Public Law 690, August 8, 1946
Patent expires July 27, 1962

6 Claims. (Cl. 260—528)

This invention relates to a process for producing ketogulonic acid and its esters.

It is known that sorbose can partially be converted into ketogulonic acid by direct oxidation with nitric acid and that the ketogulonic acid can subsequently be converted into vitamin C.

However the yield of this oxidation reaction is only small; this is not only due to the fact that other oxidation or decomposition products are also formed in large amounts, and that frequently a part of the initial product is not converted and remains in the liquid which is finally obtained, but is especially due to the fact that the separation of the ascorbic acid from the oxidation liquid is extremely difficult and is accompanied with great losses. It would be desirable to separate the ketogulonic acid first in a pure state and to convert the same into ascorbic acid only after this separation. However, this separation of the ketogulonic acid could not be effected up to now.

During the experiments made on this subject by me, it has been found quite unexpectedly that by direct oxidation of sorbose with nitric acid there are formed, besides the ketogulonic acid, by-products which are determined as ascorbic acid by the usual method of analysis, according to which the ketogulonic acid is converted into ascorbic acid, which is titrated with dichlorophenol-indophenol; these by-products, however, are not ascorbic acid. In this manner too favourable results are thus obtained by analysis, whilst the proportion of ascorbic acid with regard to the by-products which behave as ascorbic acid is unknown and thus the most favourable oxidation conditions are unknown.

Moreover it appeared that certain compounds, probably esters, are formed with the nitric acid; these compounds, after some time, cause an evolution of nitrous vapours from the solution of the oxidation products, which solution has been neutralized and concentrated in vacuo; this evolution causes a considerable reduction of the yield.

I have now found that the said nitric-acid compounds can be decomposed by means of reducing-agents, such as sulfurdioxide, zinc and acid or more particularly hydrogen sulfide. The troublesome by-products may be eliminated entirely or substantially by treating, after the treatment with reducing agents, the neutral or slightly acid solution of the oxidation products with lead compounds, particularly with lead acetate, the by-products being thereby precipitated in the form of insoluble substances. If it is attempted to determine the content of "ketogulonic acid" in the precipitated lead compounds in the usual manner, it is found, after conversion into "ascorbic acid" by means of hydrochloric acid and titration with dichloro-phenol-indophenol that in the precipitated matter ascorbic acid or substances which behave as such are formed. However from these precipitated substances it is impossible to isolate ketogulonic acid or ascorbic acid in crystalline form.

The filtrate is liberated from lead compounds which may be carried out advantageously by introducing hydrogen sulfide or for instance also by treatment with sulfuric acid.

Moreover it has been found that the treatment with lead salts in order to eliminate troublesome by-products can also be effected advantageously before the treatment of the oxidation liquid with the reducing agents. When carrying out these two treatments in this reversed order the advantage is obtained that during the treatment with the reducing agent, hydrogensulfide coming more particularly in consideration as such, an elimination of the excess of lead-ions takes place beside the decomposition of the nitric acid compounds and simultaneously therewith. Consequently this results in a simplification of the process, because a subsequent special separation of the lead compounds, such as is carried out when the treatment with the reducing agent takes place before that with the lead salts, is rendered superfluous. Besides this, when working in this reversed order a higher yield of ketogulonic acid or esters thereof is frequently obtained.

The ketogulonic acid can easily be recovered from the liquid which has been submitted to the aforesaid treatments according to my invention. To this end one may for instance esterify with methanol after concentration, the methylester of ketogulonic acid crystallising subsequently. It is also possible to convert directly the resulting solution into ascorbic acid, for example according to the processes disclosed in French Patent Specifications 799,883, 806,926, 888,684 and 892,954.

The following examples illustrate the process according to my invention, without being limited thereto.

*Example 1*

5 gr. of sorbose is dissolved in 10 cm.$^3$ of water and this solution is placed in a boiling water bath. As soon as the solution has adopted the temperature of the bath, 10 cm.$^3$ of nitric acid (spec. gr.=1.4) which has been brought previously to a temperature of 100° C. is added at once. Immediately a rather violent reaction starts with a development of nitrous vapours. After 5 minutes the reaction is interrupted by pouring the solution onto ice. Then the reaction mixture is neutralized with calcium carbonate, filtered, concentrated in vacuo down to about 20 cm.$^3$ and poured into 150 cm.$^3$ of ethanol. After standing for some time the precipitate, which is of a light yellow colour, is filtered and washed with some ethanol. In this manner a quantity of 3.45 gr. of calcium salt is obtained. When subjecting successively in the same manner 20 and 50 gr. sorbose to the oxidation the quantities of calcium salt obtained are 10.85 and 28 gr. respectively. By working up larger quantities of liquid, originating consequently from the oxidation of a larger quantity of sorbose, it is found that the development of nitrous vapours already takes place during the concentration in vacuo, probably as a result of the longer duration necessary for the evaporation.

The same experiments were repeated, but now with introduction of hydrogen sulfide into the neutralized reaction mixture, which is left to stand during one night, filtered in order to eliminate the excess of calcium carbonate and separated sulfur and then concentrated. Now there is not observed any development of nitrous vapours. The yields of calcium salt after precipitation with ethanol and starting from 5, 20 and 50 gr. of sorbose amounted to 3.5, 15 and 34.5 gr. respectively and are thus almost proportionate to the quantities of the initial material.

In case the calcium is now eliminated from the calcium salts by means of oxalic or sulfuric acid and the filtrate is then esterified with methanol one succeeds only exceptionally in isolating the methylester of ketogulonic acid. Mostly one obtains a dark non-crystallisable syrup.

In order to obtain a further purification 2 gr. of calcium salt of a portion which has been purified by precipitating several times with ethanol (Ca-content 9.8%, content of "ketogulonic acid" 38%) are dissolved in 3 cm.$^3$ of water. The resulting solution possesses a neutral reaction to litmus. To this solution a solution of 0.8 gr. of lead acetate (Pb(CH$_3$COO)$_2$ 3 aq.) in 3 cm.$^3$ of water is added. After being left to stand for some time the precipitate is centrifuged, then suspended in water and again centrifuged. The precipitated lead compounds contain 16% "ketogulonic acid." The "ketogulonic acid" content is determined by conversion with hydrochloric acid of 14% at a temperature of 100° C. followed by titration of the reducing substance formed, by means of dichloro phenol-indophenol. This determination therefore gives no indication whatsoever as to the nature of the reducing substance.

The liquid remaining on top of the centrifugate is liberated from lead by means of hydrogen sulfide and concentrated in vacuo down to a small volume. The liquid is introduced into ethanol, a precipitate being formed thereby which is then filtered. The weight of the precipitate is 1.35 gr., its ketogulonic acid content 37% and its calcium content 10.07%. The product was only slightly coloured.

*Example 2*

A quantity of 2 gr. of calcium salt prepared in the same manner as in Example 1 is purified with lead acetate just as described in Example 1. However, the solution is now acidified before the addition of the lead acetate, with some drops of glacial acetic acid until the reaction is definitely acid. The centrifugate has a ketogulonic acid content of 13.5%. The weight of the calcium salt obtained as final product, amounts now to 1.8 gr., it contains 32% ketogulonic acid and 9.5% calcium. The product is also only slightly coloured. The calcium is eliminated in the form of oxalate with oxalic acid in the calculated quantity. The filtrate is concentrated in vacuo and then dissolved in methanol, this solvent is then again evaporated and the operation repeated several times in order to remove completely the water. Then the syrup which has a light-brown colour is esterified with methanol into which a small quantity of hydrochloric acid has been introduced. After evaporation of the methanol the remaining syrup crystallized rather rapidly. The crystals are freed from the adhering oil by means of methanol and acetone. The melting point is then 152° C.

*Example 3*

To a solution of 10 gr. of sorbose in 20 cm.$^3$ of water which is kept in a boiling water bath, 20 cm.$^3$ of nitric acid (spec. gr.=1.4) are added which have been previously brought to 100° C. After 3 minutes the reaction is interrupted by pouring the solution onto ice, then the solution is neutralized with calcium carbonate and saturated with hydrogen sulfide. After standing during one night at room temperature the hydrogen sulfide is expelled by means of a current of nitrogen, the excess of calcium carbonate and the separated sulfur filtered and the solution concentrated in vacuo to a volume of 35 cm.$^3$. The yellow syruplike residue is introduced into 300 cm.$^3$ ethanol, filtered after 1 night's standing at room temperature, the yellow precipitate being then washed with some ethanol. To this precipitate, which is rather voluminous and contains a considerable quantity of alcohol, water is added until the total volume amounts to about 100 cm.$^3$. A part of the substance does not enter into solution. To this turbid brown solution a concentrated solution of 3 gr. lead acetate Pb(CH$_3$COO)$_2$ 3 aq. is now added. After standing for some hours the brown precipitate is separated from the liquid by centrifugation. The Precipitate is then once more suspended in 20 cm.$^3$ of water and again centrifugated. The portions of water being decanted are collected and liberated from lead by means of hydrogen sulfide. The clear, slightly yellow filtrate is concentrated in vacuo to a volume of 18 cm.$^3$. The clear and slightly coloured solution is now introduced into 150 cm.$^3$ of ethanol, the precipitated calcium salts filtered, washed with some ethanol and then liberated in vacuo from the adhering solvent. The weight of the very slightly coloured precipitate is 3.43 gr., its Ca-content 10.19% and its "ketogulonic acid" content 35%. (In a parallel experiment the treatment with lead acetate is carried out in a solution acidified with acetic acid, viz. 15 drops of glacial acetic acid. In this experiment the weight of the precipitated calcium salts which is finally obtained amounts to 3.45 gr., the Ca-content being 10.19% and the "ketogulonic acid" content 37%.)

From the mixture of calcium salts prepared in this manner the calcium is now eliminated by means of oxalic acid in the calculated quantity. To this end the calcium salts are dissolved in a quantity of water which is as small as possible. A clear yellow coloured solution is obtained to which a concentrated oxalic acid solution of known concentration is added. The precipitated calcium oxalate is filtered and washed three times with a little cold water. Then the filtrate is concentrated in vacuo to a yellow clear syrup. This syrup is absorbed into methanol and then this solvent is again evaporated in vacuo. If necessary this process is repeated three times with absolute methanol in order to expel all traces of water. The residue is subsequently dissolved in absolute methanol and the solution is kept during one night at room temperature. The following day the solvent is again expelled in vacuo and the residue again absorbed in absolute methanol. To the resulting solution some drops of methanolic hydrochloric acid are added and then the solution is brought and maintained at its boiling point during three hours in a flask provided with a reflux cooler. After standing during one night, the solvent is then evaporated in vacuo, the residue again absorbed in absolute methanol and the solution again concentrated in vacuo in order to expel any traces of hydrochloric acid. The residue which is now light-brown, clear and viscous begins to crystallize after being kept for some days at room temperature. However the crystallisation is considerably accelerated by addition of some cm.³ of absolute methanol. By rubbing and stirring the syrup is dissolved in the methanol and the crystals can be isolated by filtration. They are washed with some methanol and dried in vacuo. The weight of the white and crystallized matter which has a pretty appearance is 420 mgr. Melting point 149–151° C.

The filtrate is liberated in vacuo as completely as possible from the solvent. The remaining brown mixture of oil and crystals is rubbed with anhydrous acetone until the oil begins to dissolve. The crystals are then filtered and washed with acetone. The product obtained differs only slightly from the first crystal fraction. The melting point is somewhat lower: 147–149° C. Weight 330 mgr. From the filtrate a small quantity of ester can still be isolated in a less pure state.

*Example 4*

10 gr. of sorbose and 2 gr. of sodium nitrate are dissolved in 10 cm.³ of water; then 10 cm.³ of nitric acid (spec. grav.=1.4) are added and the resulting solution is maintained during 144 hours at 20° C. Then the reaction mixture is neutralized whilst cooling, with barium carbonate, filtered and brought to a volume of 35 cm.³. To the resulting solution a solution of 3 gr. of lead acetate in 5 cm.³ of water is added. After being kept at rest for some time the precipitate is centrifuged, suspended in water and again centrifuged.

The upper liquid is saturated with hydrogen sulfide and after 1 night's standing the lead sulfide is filtered. The solution of the barium salts is then desiccated by evaporation.

The residue is then absorbed in 15 cm.³ of water, the separated barium nitrate filtered, washed with 3 cm.³ of water and the solution of the barium salts poured into 150 cm.³ of methanol. 5.4 gr. of salt is obtained, having a "ketogulonic acid" content of 33%. From the resulting salts the barium is eliminated by means of sulfuric acid and the salt solution is then esterified as described in Example 2. By means of acetone the crystals obtained are liberated of the adhering syrup. 1.28 gr. of crystals of the methylester are obtained.

*Example 5*

10 gr. of sorbose and 2 gr. of sodium nitrite are dissolved in 10 cm.³ of water; then 10 cm.³ of nitric acid (spec. grav.=1.4) is added and the resulting solution is maintained during 144 hours at 20° C. The working up of the oxidation liquid obtained in this manner is effected in an analogous manner to that described in Example 1. To this end the solution, neutralized with barium carbonate, is first kept saturated with hydrogen sulfide during the night, then it is desiccated by evaporation, absorbed in 30 cm.³ of water, the barium nitrate eliminated by filtration, washed with 5 cm.³ of water and the solution poured into 300 cm.³ of methanol. The weight of the barium salts obtained is 7.9 gr., having a "ketogulonic acid" content of 31%. After the purification with lead acetate the quantity of salt amounts to 5.6 gr., the "ketogulonic acid" content being 34%. From this salt one can obtain in the above described manner 1.30 gr. of the methylester.

*Example 6*

10 gr. of sorbose and 2 gr. of sodium nitrite are dissolved in 9 cm.³ of water, whilst cooling to 0° C. To the resulting solution 20 cm.³ of nitric acid (spec. grav.=1.4) cooled to 0° C. are then added and the solution maintained at 0° C. during 168 hours. In the same manner as described in Example 4 the reaction liquid is neutralized with barium carbonate, immediately purified with 2 gr. of lead acetate, treated with hydrogen sulfide, and, after 1 night's standing, the lead sulfide is filtered. The solution is then evaporated to dryness, the residue absorbed in water, the barium nitrate filtered off and the solution poured into methanol. 7.1 gr. of salt, having a "ketogulonic acid" content of 44%, is obtained. This salt is composed for about 40% of pure barium ketogulonate.

*Example 7*

10 gr. of sorbose are dissolved in 20 cm.³ of water and the resulting solution placed into a boiling water bath. As soon as the solution has taken up the temperature of the bath, 20 cm.³ nitric acid (sp. gr.=1.4) which has previously been brought to 100° C., are added at once. After 3 minutes the reaction is interrupted by pouring onto a little ice. The reaction mixture is then neutralized with barium carbonate. After filtration the volume of the solution amounts to 60 cm.³. To this solution a solution of 3 g. lead acetate in 10 cm.³ of water is now added. After a few hours the precipitate is removed by centrifugation. The solution is then saturated with hydrogen sulfide for the elimination of the lead and moreover for the decomposition of the nitric acid esters which are formed in the oxidation. After 24 hours the mixture is filtered and the filtrate evaporated in vacuo until dry. The remaining salts are taken up in a little water and freed from the barium nitrate by filtration. The filtrate after being brought to a volume of 18 cm.³ is subsequently poured into 150 cm.³ methanol. The yield of barium salts amounts to 6.9 gr., having a "ketogulonic acid" content of 26%. This salt, after removal of the barium with sulfuric acid, is esterified with methanol in the usual way. In this way 0.85 gr. ketogulonic acid methylester are obtained.

*Example 8*

5 gr. of sorbose, dissolved in 10 cm.³ of water are oxidized during 3 minutes with 10 cm.³ nitric acid (sp. gr.=1.4) at 100° C. After termination of the reaction the mixture is poured into iced water and the resulting solution neutralized with calcium-carbonate. Then 10 cm.³ of a saturated aqueous solution of sulfur-dioxide is added. After standing for 24 hours at room temperature this solution is concentrated in vacuo, during which concentration no evolution of nitrous vapours is perceptible; such an evolution does take place when the treatment with sulfurdioxide is omitted. By precipitation with alcohol a colourless substance of pretty appearance is obtainable, which amounts to 3.6 gr. after drying over calcium chloride. By working up in the manner described in Example 3 this colourless substance yields 0.4 gr. of ketogulonic acid methylester.

What I claim is:

1. In the process of producing ketogulonic acid by oxidation of sorbose with nitric acid, the steps of first decomposing by treatment with hydrogen sulfide the nitric acid compounds formed in the oxidation product during oxidation; and thereafter precipitating by treatment with lead acetate organic impurities contained in the thus treated oxidation product and which hinder crystallization of said ketogulonic acid.

2. In the process of producing ketogulonic acid by oxidation of sorbose with nitric acid, the steps of first precipitating by treatment with lead acetate organic impurities contained in the oxidation product and which hinder crystallization of said ketogulonic acid; and then decomposing the nitric acid compounds formed in the oxidation product during oxidation by treatment with hydrogen sulfide.

3. In the process of producing ketogulonic acid by oxidation of sorbose with nitric acid, the steps of first decomposing by treatment with hydrogen sulfide the nitric acid compounds formed in the oxidation product during oxidation; thereafter precipitating by treatment with lead acetate organic impurities contained in the thus treated oxidation product and which hinder crystallization of said ketogulonic acid; and then removing excess lead contained in the thus pretreated oxidation product by repeated treatment with hydrogen sulfide.

4. In the process of producing ketogulonic acid by oxidation of sorbose with nitric acid, the steps of decomposing by treatment with hydrogen sulfide the nitric acid compounds formed in the oxidation product during oxidation; and precipitating by treatment with lead acetate organic impurities contained in said reaction mixture and which hinder crystallization of said ketogulonic acid.

5. Process of producing ketogulonic acid comprising the steps of oxidizing sorbose with nitric acid; neutralizing the thus obtained oxidation product; decomposing by treatment with hydrogen sulfide in the thus neutralized oxidation product the nitric acid compounds formed therein during oxidation and neutralization; precipitating by treatment with lead acetate organic impurities contained in said neutralized oxidation product and which hinder crystallization of said ketogulonic acid; and then acidifying the thus pretreated neutralized oxidation product so as to produce free ketogulonic acid.

6. Process of producing 2-keto-1-gulonic acid comprising the steps of oxidizing sorbose with nitric acid; neutralizing the thus obtained oxidation product; decomposing by treatment with hydrogen sulfide in the thus neutralized oxidation product the nitric acid compounds formed therein during oxidation and neutralization; precipitating thereafter by treatment with lead acete organic impurities contained in said thus treated neutralized oxidation product and which hinder crystallization of said ketogulonic acid; then removing by repeated treatment with hydrogen sulfide from the thus pretreated neutralized oxidation product excess lead contained therein; and finally acidifying the thus pretreated neutralized oxidation product so as to produce free ketogulonic acid.

PANCRAS J. van der LAAN.

REFERENCES CITED

The following references are of record in the file of this patent:

UNITED STATES PATENTS

| Number | Name | Date |
|---|---|---|
| 2,318,500 | King et al. | May 4, 1943 |

FOREIGN PATENTS

| Number | Country | Date |
|---|---|---|
| 108,494 | Great Britain | Sept. 9, 1920 |
| 175,347 | Switzerland | May 1, 1935 |
| 183,450 | Switzerland | June 16, 1936 |
| 451,996 | Belgium | Apr. 4, 1944 |